US012793198B2

(12) United States Patent
Han et al.

(10) Patent No.: US 12,793,198 B2
(45) Date of Patent: Nov. 10, 2026

(54) METHOD AND APPARATUS WITH DEFECT DETECTION

(71) Applicants: SAMSUNG ELECTRONICS CO., LTD., Suwon-si (KR); IUCF-HYU(Industry-University Cooperation Foundation Hanyang University), Seoul (KR)

(72) Inventors: Seungju Han, Suwon-si (KR); Sanghyuk Moon, Seoul (KR); Je Hyeong Hong, Seoul (KR); Hyeon Jeong Park, Seoul (KR)

(73) Assignees: Samsung Electronics Co., Ltd., Suwon-si (KR); IUCF-HYU(Industry-University Cooperation Foundation Hanyang University), Seoul (KR)

( * ) Notice: Subject to any disclaimer, the term of this patent is extended or adjusted under 35 U.S.C. 154(b) by 295 days.

(21) Appl. No.: 18/357,475

(22) Filed: Jul. 24, 2023

(65) Prior Publication Data

US 2024/0257329 A1 Aug. 1, 2024

(30) Foreign Application Priority Data

Feb. 1, 2023 (KR) ........................ 10-2023-0013826

(51) Int. Cl.
*G06T 7/00* (2017.01)

(52) U.S. Cl.
CPC .. *G06T 7/0004* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS 6,381,710 B1 * 4/2002 Kim .................... G06F 11/0727 714/45
8,370,282 B1 * 2/2013 Leung ................ G06V 10/7784 706/20

(Continued)

FOREIGN PATENT DOCUMENTS

KR 10-2010-0122140 A 11/2010
KR 10-2021-0047959 A 4/2021

(Continued)

OTHER PUBLICATIONS

Zhu, Jun-Yan, et al., “Toward Multimodal Image-To-Image Translation,” Advances in Neural Information Processing Systems, 2017, (12 Pages in English).

(Continued)

*Primary Examiner* — Helen Zong
(74) *Attorney, Agent, or Firm* — NSIP Law

(57) ABSTRACT

A processor-implemented method including performing an iterative training operation of a defect detection model which includes randomly assigning a label for a detected defect pattern of an object having a defect to training data responsive to the detected defect pattern being determined to be a defect pattern that is not among the training data, dependent on the label being determined to be a new label, generating an importance score, which represents a frequency of an occurrence of the defect pattern, and executing the training of the defect detection model using the defect data of the defect pattern when the importance score exceeds the first threshold value, and deleting the defect data when the importance score does not exceed the first threshold.

20 Claims, 7 Drawing Sheets

(56) References Cited

U.S. PATENT DOCUMENTS

| | | | | |
|---|---|---|---|---|
| 9,202,517 | B1 * | 12/2015 | Barlow | G11B 20/10305 |
| 11,620,558 | B1 * | 4/2023 | Xu | G06N 7/01 706/12 |
| 2019/0257767 | A1 * | 8/2019 | Shaubi | G06F 30/20 |
| 2020/0098124 | A1 * | 3/2020 | Wang | A61B 5/7267 |
| 2020/0226743 | A1 * | 7/2020 | Savchenko | G06V 10/774 |
| 2020/0302273 | A1 * | 9/2020 | Chung | G06V 10/764 |
| 2020/0374305 | A1 | 11/2020 | Kursun | |
| 2021/0178752 | A1 * | 6/2021 | Johnson | B41J 2/0451 |
| 2021/0282731 | A1 * | 9/2021 | Vaillant | A61B 6/504 |
| 2021/0406727 | A1 * | 12/2021 | Wang | G06N 5/04 |
| 2022/0012878 | A1 * | 1/2022 | Aoyama | G06T 11/00 |
| 2022/0183642 | A1 * | 6/2022 | Yamamoto | A61B 6/487 |
| 2022/0292317 | A1 * | 9/2022 | Hirai | G06V 20/52 |
| 2022/0334567 | A1 * | 10/2022 | Bachiraju | G05B 19/4155 |
| 2023/0014823 | A1 * | 1/2023 | Cheng | G06T 7/0004 |
| 2023/0206425 | A1 * | 6/2023 | Beauchemin | G06T 7/001 382/152 |
| 2023/0281518 | A1 * | 9/2023 | Verma | G06N 3/045 706/12 |
| 2023/0348982 | A1 * | 11/2023 | Krishnakumar | C12Q 1/6869 |
| 2024/0202605 | A1 * | 6/2024 | Lester | G06N 3/08 |
| 2024/0265543 | A1 * | 8/2024 | Sakaguchi | A61B 6/5205 |
| 2025/0339034 | A1 * | 11/2025 | Ughi | A61B 1/06 |

FOREIGN PATENT DOCUMENTS

| | | | |
|---|---|---|---|
| KR | 10-2021-0065285 | A | 6/2021 |
| KR | 10-2263716 | B1 | 6/2021 |

OTHER PUBLICATIONS

Zhai, Mengyao, et al., "Lifelong GAN: Continual Learning for Conditional Image Generation," Proceedings of the IEEE/CVF International Conference on Computer Vision, 2019, (p. 2759-2768).

Yu, Naigong, et al., "Research on Wafer Surface Defect Pattern Detection Method Based on Incremental Learning," Journal of Physics: Conference Series, vol. 2078, 2021, (8 Pages in English).

* cited by examiner

METHOD AND APPARATUS WITH DEFECT DETECTION

CROSS-REFERENCE TO RELATED APPLICATIONS

This application claims the benefit under 35 USC § 119(a) of Korean Patent Application No. 10-2023-0013826, filed on Feb. 1, 2023, in the Korean Intellectual Property Office, the entire disclosure of which is incorporated herein by reference for all purposes.

BACKGROUND

1. Field

The following description relates to a method and apparatus with defect detection.

2. Description of Related Art

In semiconductor manufacturing, manufacturing defect data may be studied to improve a manufacturing yield. However, it may be difficult to obtain defect data based on actual industrial environments because the process may only provide low yields (e.g., a small sample size) and because of trade secrets (e.g., data is not shared).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a processor-implemented method including performing an iterative training operation of a defect detection model which includes randomly assigning a label for a detected defect pattern of an object having a defect to training data responsive to the detected defect pattern being determined to be a defect pattern that is not among the training data, dependent on the label being determined to be a new label, generating an importance score, which represents a frequency of an occurrence of the defect pattern, and executing the training of the defect detection model using the defect data of the defect pattern when the importance score exceeds the first threshold value, and deleting the defect data when the importance score does not exceed the first threshold.

The training of the defect detection model may include calculating a quality score of defect image data that is output from the trained defect detection model and iteratively performing the training of the defect detection model until the calculated quality score becomes less than a second threshold value.

The calculating of the quality score may be based on statistical values comprising an average value and a standard deviation value of classification prediction values for the defect pattern and on a true/false classification probability value for the defect pattern.

The generating of the importance score may be based on one of a determined predefined frequency of occurrence of the defect data and a determined distribution of each pattern of a data set related to the defect data.

The assigning of the label may include performing clustering algorithm and a k-nearest neighbors (k-NN) algorithm and assigning a random label to the detected defect pattern dependent on result of the clustering algorithm and the k-nearest neighbors (k-NN) algorithm.

The defect detection model may include a conditional generative adversarial network (CGAN).

The method may include a non-transitory computer-readable storage medium storing instructions that, when executed by a processor, cause the processor to perform the method.

In a general aspect, here is provided an electronic apparatus including a processor configured to performing an iterative training operation of a defect detection model including randomly assign a label for a detected defect pattern to training data responsive to the detected defect pattern being determined to be a defect pattern that is not among the training data, dependent on the label being determined to be a new label type, generate an importance score, which represents a frequency of an occurrence of the defect pattern, and execute the training of the defect detection model using the defect data of the defect pattern when the importance score exceeds the first threshold value, and delete the defect data when the importance score does not exceed the first threshold.

The processor may be configured to calculate a quality score of defect image data that is output from the trained defect detection model and iteratively perform the training of the defect detection model until the calculated quality score becomes less than a second threshold value.

The calculating of the quality score may be based on statistical values comprising an average value and a standard deviation value of classification prediction values for the defect pattern and on a true/false classification probability value for the defect pattern.

The generating of the importance score may be based on one of a determined predefined frequency of occurrence of the defect data and a determined distribution of each pattern of a data set related to the defect data.

The assigning of the label may include performing a clustering algorithm and a k-nearest neighbors (k-NN) algorithm and assigning a random label to the detected defect pattern dependent on result of the clustering algorithm and the k-nearest neighbors (k-NN) algorithm.

The defect detection model may be a conditional generative adversarial network (CGAN), and the training data may correspond to image data of an object having the defect.

In a general aspect, here is provided a processor-implemented method including randomly assigning a defect label to a determined unknown detected defect type not among defect types in a training data set, generating an importance score for the unknown detected defect type, selectively training a machine learning model using the unknown detected defect type when the importance score meets a first threshold value, and deleting the unknown detected defect type when the importance score fails to meet the first threshold value.

The generating of the importance score may include generating the importance score based on a determined frequency of occurrence of the unknown detected defect type.

The method may include performing a knowledge distillation of a corresponding pattern of the unknown detected defect type to add the corresponding pattern to the training data set when the importance score meets the first threshold.

The method may include performing similarity comparisons between a plurality of defect types within the training data set to generate similarity values between respective pairs of the plurality of defect types and clustering the plurality of defects based on respective similarity values.

The random assigning of the defect label may be based on a respective similarity value between the unknown detected defect types and a respective defect type of the plurality of defect types having a similar similarity value.

The method may include using the trained model to detect another defect that is determined to be a known defect type. Other features and aspects will be apparent from the following detailed description, the drawings, and the claims.

Figure 1:
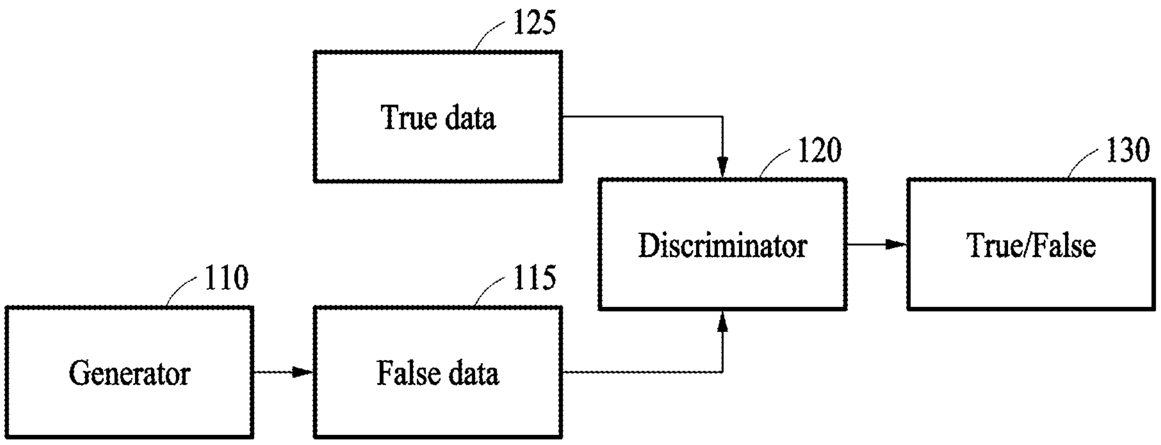
FIG. 1 illustrates an example generative adversarial network (GAN) according to one or more embodiments.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment (e.g., as to what an example or embodiment may include or implement) means that at least one example or embodiment exists where such a feature is included or implemented, while all examples are not limited thereto. The use of the terms "example" or "embodiment" herein have a same meaning (e.g., the phrasing "in one example" has a same meaning as "in one embodiment", and "one or more examples" has a same meaning as "in one or more embodiments").

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present. Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

In semiconductor manufacturing, it may be difficult to obtain defect data without financial costs (i.e., gaining or sharing trade secrets) and/or a decline in productivity in typical industrial environments. Therefore, there may be a demand for methods that generate virtual data for semiconductor manufacturing and then being able to use that virtual data to train a defect detection model with machine learning.

Various studies have been conducted on a method of generating virtual data and using the virtual data for training the defect detection model so that defect data may be obtained in an industrial setting without incurring the financial damage and productivity loss that may be caused by defective products. However, existing studies had problems where only low-resolution wafer map images may be generated, that training is not possible when a new defect pattern, or defect type, occurs, that there is no method of augmenting a data set for training the defect detection model, that a method of training the defect detection model reflecting an importance of a defect pattern may not be proposed, and the like.

FIG. 1 illustrates an example generative adversarial network (GAN) according to one or more embodiments.

Referring to FIG. 1, in a non-limiting example, a GAN is a machine learning model (e.g., a neural network model) that generates virtual data similar to input data through adversarial learning of a generator model 110 and a discriminator model 120. The adversarial learning may be repeatedly performed by exchanging processes of training the discriminator model 120 first and then training the generator model 110. The training of the discriminator model 120 may include two processes. In a non-limiting example, one such process of training the discriminator 120 may include inputting true data 125 to the discriminator model 120 and training the discriminator model 120 to classify the true data 125 as true. In a non-limiting example, the second such process may include inputting false data 115 generated by the generator model 110 to the discriminator model 120 and training the discriminator model 120 to classify the false data 115 as false. Through the above processes, the discriminator model 120 may be trained to classify the true data 125 as true and the false data 115 as false.

In an example, after the discriminator model 120 is trained, the generator model 110 may be trained in a manner to deceive the trained discriminator model 120. The generator model 110 may be trained to generate the false data 115 where the false data 115 is similar enough to the true data 125 to the point that the discriminator model 120 may classify the false data 115 as true. When the above processes are repeated, the discriminator model 120 and the generator model 110 may recognize each other as hostile competitors and consequently both the discriminator model 120 and the generator model 110 may be trained.

As a result of the above described hostile training of the discriminator model 120, the generator model 110 may generate the false data 115 that is similar to the true data 125, and thus, the discriminator model 120 may not reliably distinguish between the true data 125 and the false data 115. That is, a structure may be formed in which the generator model 110 and the discriminator model 120 develop each other competitively while the generator model 110 of the GAN tries to lower the probability of succeeding in classification, and the discriminator model 120 tries to increase the probability of succeeding in classification. A loss function used for the training of the generator model 110 and the discriminator model 120 may be represented as, for example, Equation 1 below.

$$\min_G \max_D V(D, G) = \mathbb{E}_{x\sim p_{data}(x)}[\log D(x)] + \mathbb{E}_{z\sim p_z(z)}[\log(1 - D(G(z)))] \quad \text{Equation 1}$$

Referring to Equation 1, D(x) denotes the probability for a classification model, z denotes random noise, and G(z) denotes the probability for a generative model. A classification model $$\max_D V(D)$$

may be trained so that the probability for data $x\sim p_{data}(x)$ extracted from an actual distribution is "1" and that the probability for data $z\sim p_z(z)$ extracted from a generation data distribution is "0". A generative model $$\min_G V(G)$$

may be trained so that the probability for the data $z\sim p_z(z)$ extracted from the generation data distribution is "1".

Figure 2:
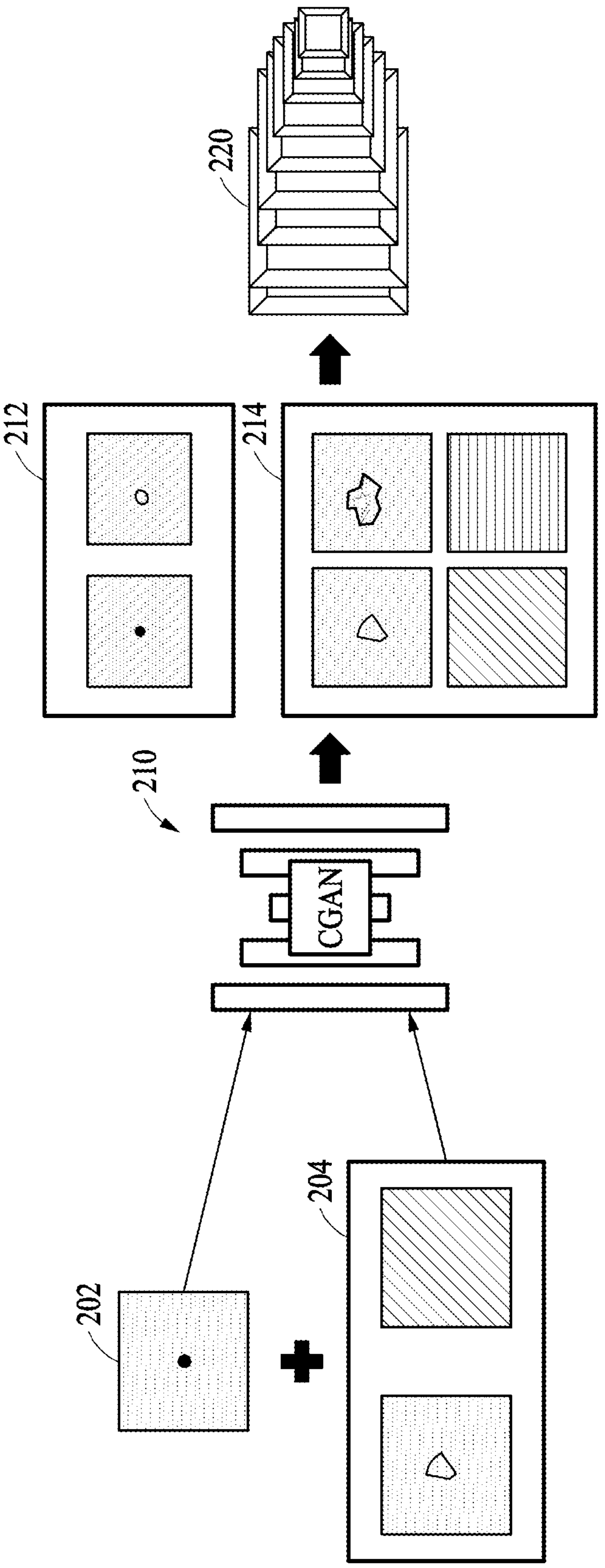
FIG. 2 illustrates an example electronic apparatus with defect detection model training according to one or more embodiments.

FIG. 2 illustrates an example electronic apparatus with defect detection model training according to one or more embodiments.

Referring to FIG. 2, in a non-limiting example, an electronic apparatus (e.g., electronic apparatus 600 of FIG. 6) for training a defect detection model may include an image generator that uses a condition-based generative model 210 such as a conditional generative adversarial network (CGAN). In addition, a label for a defect pattern (or defect type) to be generated and a defect pattern image to be generated may be input to the electronic apparatus without limitation on the type of input image to be generated, such as a wafer map, a scanning electron microscope (SEM), transmission electron microscope (TEM), and the like. Furthermore, in order to generate a virtual existing defect image 212 with high quality and a virtual new defect pattern image 214 with high quality from both an existing defect pattern 202 and a new defect pattern 204, a defect detection model 220 may be trained through a continuous training method based on a knowledge distillation technique, which transfers knowledge on generation of an existing defect image to a trained model when a new defect pattern is learned. The trained defect detection model may then be used to learn new patterns to detect new defects.

Figure 3:
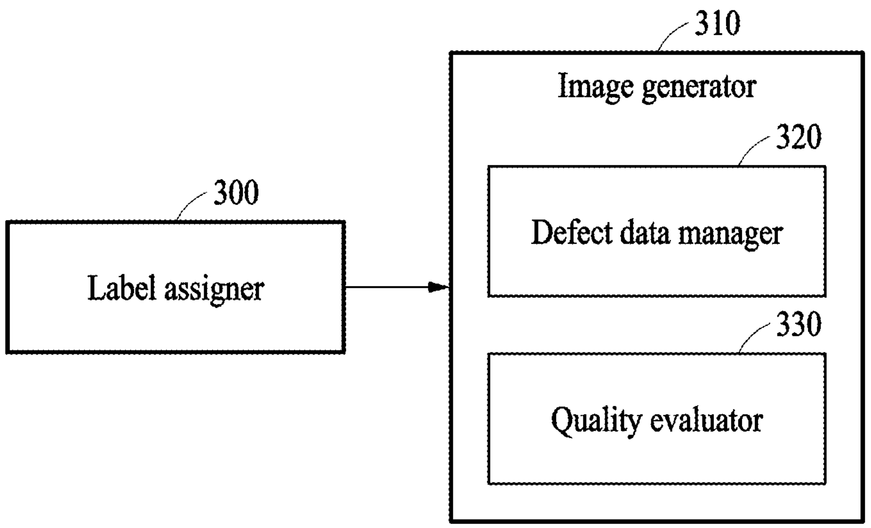
FIG. 3 illustrates an example electronic apparatus with defect detection model training according to one or more embodiments.

FIG. 3 illustrates an example electronic apparatus with defect detection model training according to one or more embodiments.

Referring to FIG. 3, in a non-limiting example, the electronic apparatus (e.g., electronic apparatus 600 of FIG. 6) for training the defect detection model may include a label assigner 300 (pseudo labeling) and an image generator 310. The image generator 310 may include a defect data manager 320 and a quality evaluator 330. Each of the label assigner 300, image generator 310, defect data manager 320, and the quality evaluator 330 may include a processor or processors and a memory, such as the processor 610 and memory 620 of FIG. 6.

The label assigner 300 may assign a random label to a new defect pattern image based on clustering according to similarity, a k-nearest neighbors (k-NN) algorithm, and the like so that the electronic apparatus may train a new defect pattern without a label. The label assigner 300 may be provide an increased applicability for the electronic apparatus in industrial settings.

In an example, the defect data manager 320 may forget training with respect to a defect pattern when the defect occurs at a low frequency and when an importance score is used for determining a degree of forgetting of the defect pattern. Accordingly, the defect data manager 320 may mitigate limitations of a generation method based on the continuous training based on knowledge distillation. Here, the importance score may be present as prior information designated by experts with knowledge of defect patterns or the importance score may be an indicator that a model may learn on its own based on the distribution of each pattern of the data set, and the importance score may be updated according to changes in the industrial and manufacturing processer.

In an example, the quality evaluator 330 may provide high-quality training for each defect pattern using a quality score for determining whether to continue training with a new pattern, and to improve a trade-off with which the quality of the existing defect pattern generation image degrades when a new defect pattern is learned. In an example, it may be possible to use statistical values such as an average value and a standard deviation value of classification prediction values, and the like, as the quality score by utilizing a model that classifies defect patterns, and a true/false output value of a discriminator of a GAN may also be used as the quality score.

Thus, in an example, the electronic apparatus may be utilized to establish a virtual large-scale data set that may be used to train an artificial intelligence (AI) model (e.g., a neural network) that detects whether a defect occurs without incurring an economic loss that may be caused by a defect occurring in an actual industrial or manufacturing site. In addition, in an example where a training method is capable of promptly responding to changes in the defect patterns that may occur in the process may be promptly employed in the industrial or manufacturing setting.

Figure 4A:
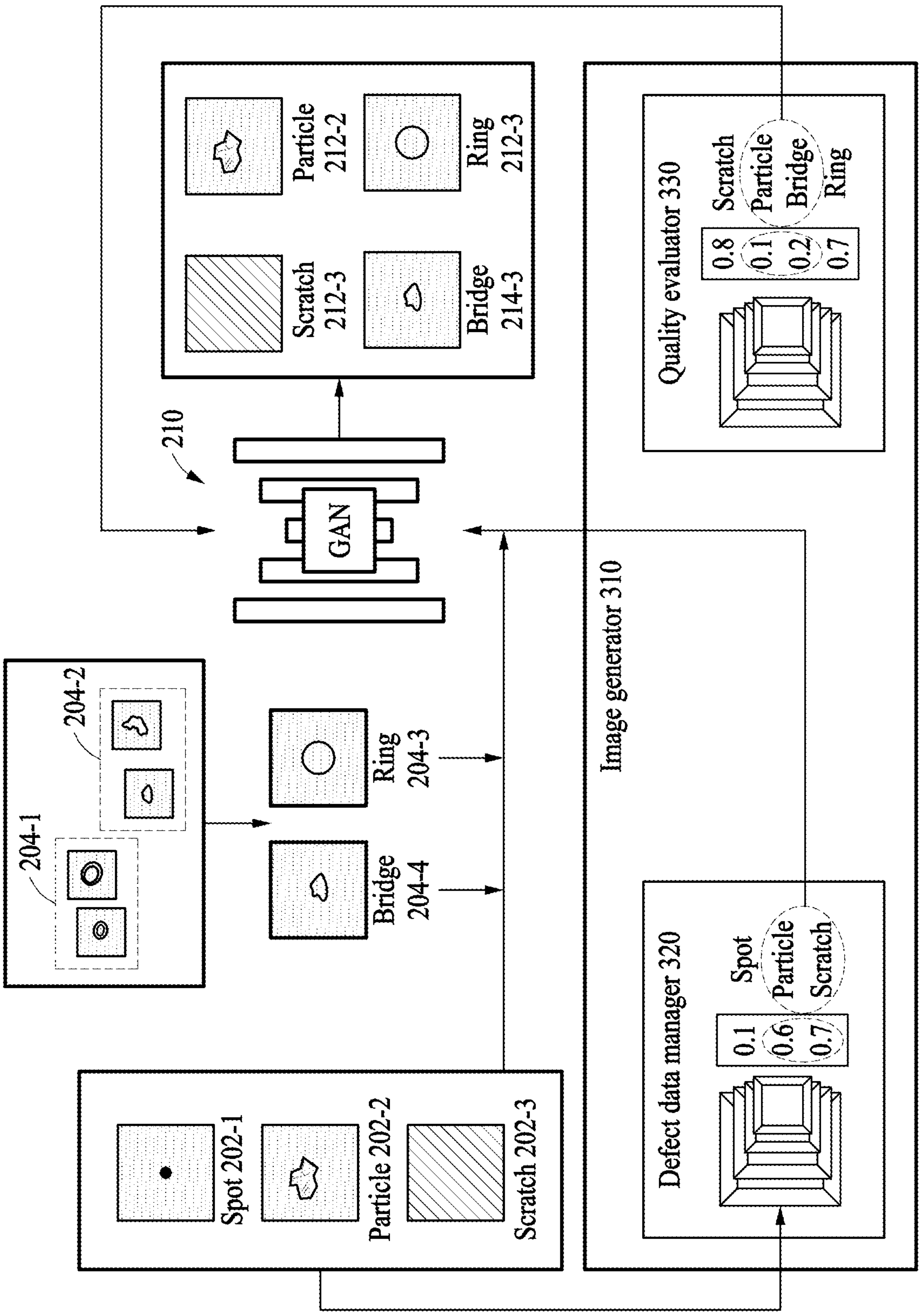
FIGS. 4A and 4B illustrate example methods of training a defect detection model according to one or more embodiments.
Figure 4B:
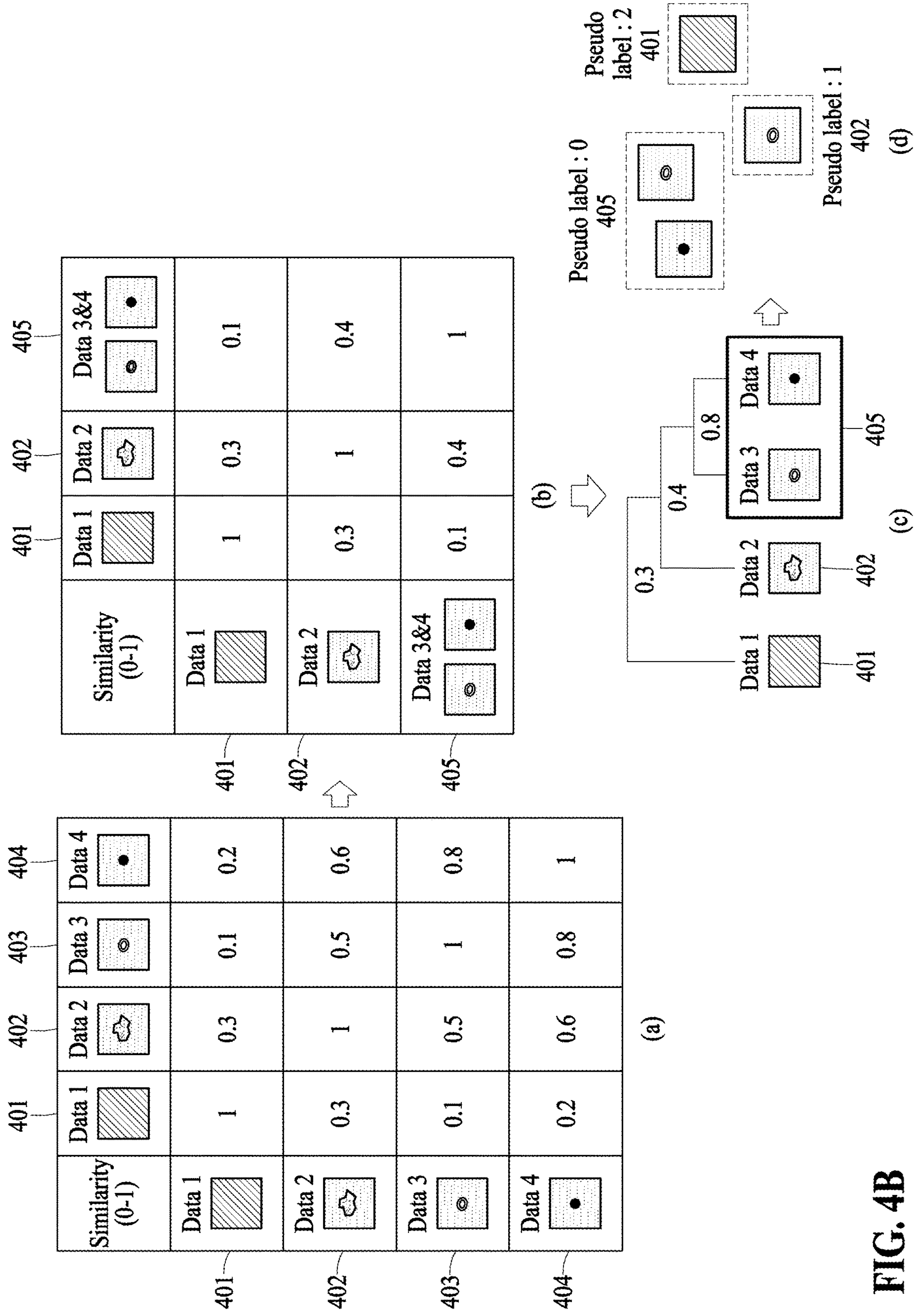

FIGS. 4A and 4B illustrate example methods of training a defect detection model according to one or more embodiments.

Referring to FIG. 4A, in a non-limiting example, an image generator of the electronic apparatus (e.g., electronic apparatus 600 of FIG. 6) for training a defect detection model may include a defect data manager for effectively generating a virtual image and a quality evaluator for calculating a quality score of defect image data that is output from a trained defect detection model. While examples are not limited thereto, the below will be explained with respect to the image generator 310, the defect data manager 320, and the quality evaluator 330 of FIG. 3

In an example, the image generator 310 may receive training data (e.g., a training data set) corresponding to image data of an object having a defect pattern to be generated. The training data may include a label for the type of defect pattern and an actual image of the defect pattern. When an existing label is not included in input defect data, a label assigner (e.g., label assigner 300) may assign a random label to the input defect data using a clustering algorithm, a k-NN algorithm, and the like and may transfer the input defect data to the image generator 310. In an example, the defect detection model 220 may generate a virtual image of types of existing defects (e.g., a spot 202-1, a particle 202-2, and a scratch 202-3). When the defect detection model 220 receives training data (e.g., a training data set) that does not include a label for the type of defect pattern, the label assigner may assign a random label for the defect pattern. The label assigner may assign a pseudo label to new image data for which a defect label has not been determined using a clustering algorithm and a k-NN algorithm, according to the similarity of features. The new defect data to which the random label is assigned through the label assigner may form training data with existing defects (a particle, a scratch, etc.) determined by the defect data manager 320. The training data may be used to train the defect detection model through a quality evaluation by the quality evaluator 330. In an example, the label assigner may assign a random label (e.g., a ring 204-3 and a bridge 204-4) for new types of defects (e.g., a ring 204-1 and a bridge 204-2), as described in detail with reference to FIG. 4B below.

The defect data manager 320 may select a label indicating an importance based on the importance score. The defect data manager 320 may also perform knowledge distillation to transfer learned parameter values from the defect detection model of a previous time point to the defect detection model of a next time point. The defect data manager 320 may include a look-up table of the importance score for each pattern generated by an expert, such as personnel having field knowledge on defect patterns of the defect data, or by the defect detection model 220. The defect data manager 320 may determine whether the label for the type of defect pattern in the training data is a new label and, when the label for the type of defect pattern is a new label, determine whether the importance score, which represents the frequency of the occurrence of the defect pattern, exceeds a first threshold value. The defect data manager 320 may determine whether to perform the knowledge distillation of a corresponding pattern of the defect data based on the importance score and, when the importance score of the defect pattern is low and does not exceed the first threshold value, allow the defect detection model 220 to be trained to forget corresponding knowledge. In an example, the defect data manager 320 may contribute to generating a high-quality virtual image by remembering only necessary information considering the limit on the amount of generated knowledge that may be included in the defect detection model 220 as prior information which is updated according to the changes in the process. In an example, when the importance score for the spot 202-1 is "0.1", the importance score for the particle 202-2 is "0.6," and the importance score for the scratch 202-3 is "0.7," the defect data of the spot 202-1, of which the importance score may not exceed the threshold value of the importance score, and thus may be deleted and the knowledge distillation may be performed.

In an example, when a defect detection model is trained on a new defect, the quality evaluator 330 may perform quality evaluation on labels (a particle, a scratch, etc.) for existing defects and on pseudo labels (a bridge, a ring, etc.) for the new defect and continue to train on labels of which the quality score does not reach a threshold value. The quality evaluator 330 may receive images (e.g., an image 212-3, an image 212-2, an image 214-3, and an image 212-3) generated by the defect detection model 220 as inputs and determine the degree of training related to corresponding defect pattern image generation. In determining the degree of training related to the corresponding defect pattern image generation, the quality evaluator 330 may calculate the quality score of the image, using statistical values such as an average value and a standard deviation value of prediction values of the defect detection model 220 and the like, and a true/false classification probability value of a discriminator of a GAN. Subsequently, when a corresponding score does not reach a threshold value, the quality evaluator 330 may continue to train for pattern generation until the corresponding score reaches the threshold value, and when the corresponding score reaches the threshold value, the quality evaluator 330 may end the training. In an example, the quality evaluator 330 may determine whether to continue the training by determining the degree of training for each label. The quality evaluator 330 may receive data of labels (i.e., a scratch, a particle, a bridge, and a ring) determined by the label assigner and the defect data manager 320 as data of a CGAN to be newly learned. The quality evaluator 330 may calculate the quality score during the process of training, continue to train on labels where the quality score does not reach the threshold value, and end training on labels that have reached a sufficient amount of learning. In an example, when the quality score calculated by the quality evaluator 330 is 0.8 for the scratch, 0.1 for the particle, 0.2 for the bridge, and 0.7 for the ring, the quality evaluator 330 may repeat the training for the particle and the bridge, which are examples of labels where the quality score does not reach the threshold value, so that the quality score values are the same or lower than the threshold value.

In an example, the defect detection model 220 may be a CGAN. In an example, the defect detection model 220 may include a CGAN (E.g., CGAN 210 of FIG. 2), a discriminator (e.g., discriminator model 120 of FIG. 1), and a generator (e.g., generator model 110 of FIG. 1). The discriminator may determine the true/false classification probability value of a generated virtual image. The discriminator may be trained in an adversarial way to make it difficult to determine a virtual image generated by the generator as true/false. The generator may generate a virtual image of labels (a particle, a scratch, etc.) for existing defects and pseudo labels (a bridge, a ring, etc.) for new defects through knowledge distillation. The generator may generate a virtual image suitable for a label by using label information and a latent vector as inputs.

Referring to (a) of FIG. 4B, in a non-limiting example, the label assigner may determine the similarity (e.g., similarity values or a value of the similarity) of data 1 401, data 2 402, data 3 403, and data 4 404. The label assigner may determine the similarity between the same data, such as between data 1 401 and data 1 401, between data 2 402 and data 2 402, between data 3 403 and data 3 403, and between data 4 404 and data 4 404, to be a value of "1." In addition, the label assigner may determine the similarity value between data 1 401 and data 2 402 to be "0.3," the similarity value between data 1 401 and data 3 403 to be "0.1," and the similarity value between data 1 401 and data 4 404 to be "0.2." Furthermore, the label assigner may determine the similarity value between data 2 402 and data 3 403 to be "0.5" and the similarity value between data 2 402 and data 4 404 to be "0.6." The label assigner may determine the similarity value between data 3 403 and data 4 404 to be "0.8."

Referring to (b) of FIG. 4B, in an example, the label assigner may newly assign data 3&4 405 by clustering data 3 403 and data 4 404 having the highest similarity value of "0.8" and determine the similarity value as in (a) of FIG. 4B. The label assigner may determine the similarity between data 1 401 and data 2 402 to have a value of "0.3" and the similarity between data 1 401 and data 3&4 405 to have a value of "0.1." The label assigner may determine the similarity between data 2 402 and data 3&4 405 to have a value of "0.4."

Referring to (c) and (d) of FIG. 4B, in an example, the label assigner may assign a random label to each cluster based on the result of clustering. For example, as confirmed in (a) and (b) of FIG. 4B, when the similarity value between data 1 401 and data 2 402 is "0.3", the similarity value between data 2 402 and data 3&4 405 is "0.4," and the similarity value between data 3 and data 4 that are included in data 3&4 is "0.8," the label assigner may assign a random label "0" to data 3&4 405, assign a random label "1" to data 2 402, and assign a random label "2" to data 1 401. As described herein, the label assigner may cluster each piece of data based on the similarity value between various pieces of data and may assign a random label to new data without a label based on the similarity value between clustered data.

Figure 5:
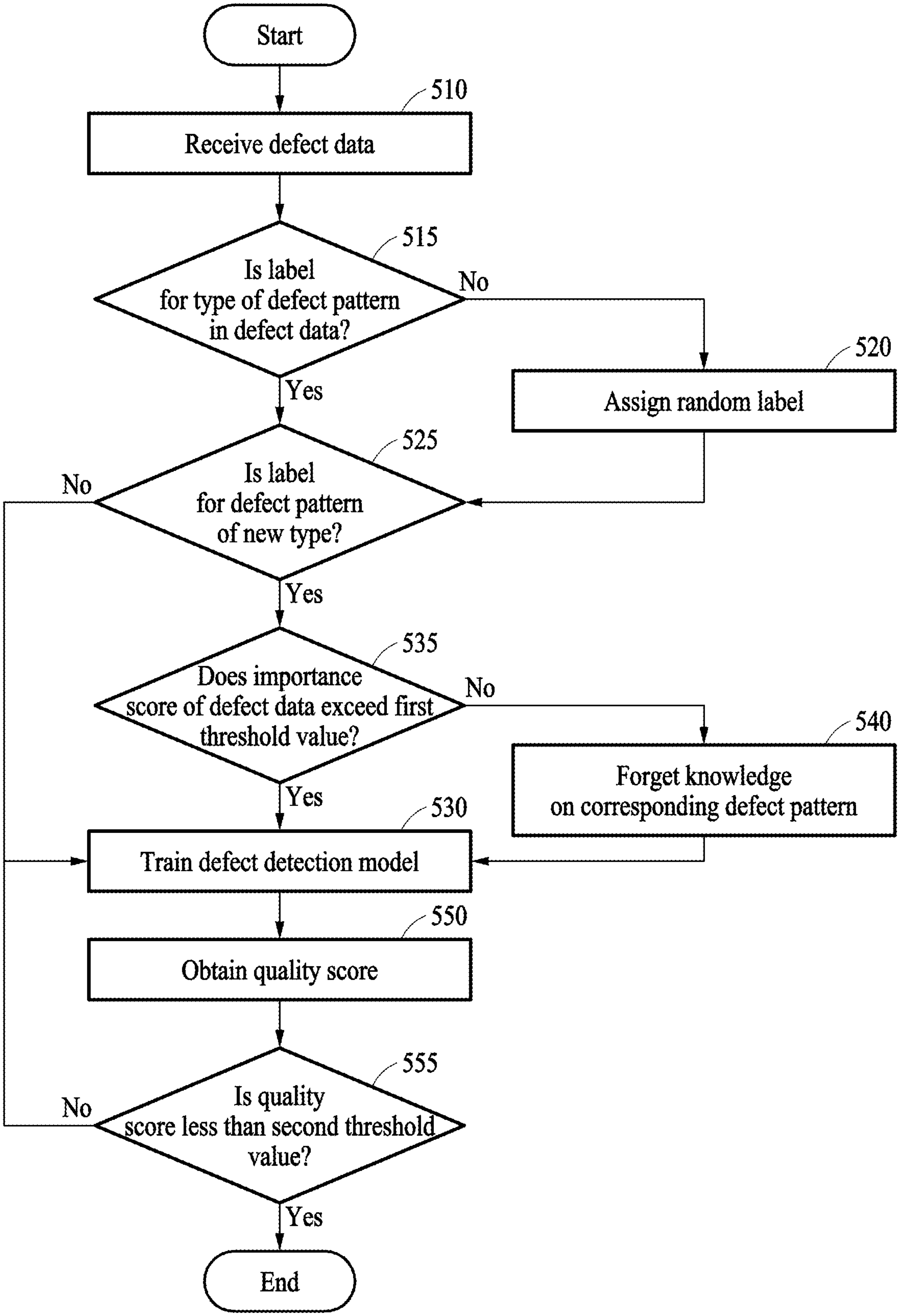
FIG. 5 illustrates an example method of training a defect detection model according to one or more embodiments.

FIG. 5 illustrates an example method of training a defect detection model according to one or more embodiments.

Referring to FIG. 5, in a non-limiting example, in operation 510, an electronic apparatus may receive defect data. The defect data may include training data corresponding to image data of an object having a defect.

In operation 515, the electronic apparatus may determine whether a label for the type of defect pattern is among the defect data. When the label for the type of defect pattern is not among the defect data, the electronic apparatus may assign a random label in operation 520. The electronic apparatus may assign the random label to a new defect pattern image based on clustering according to the similarity of defect patterns, a k-NN algorithm, and the like. An operation of assigning the random label may correspond to the operation of an label assigner (e.g., the label assigner described in greater detail above with reference to FIGS. 4A and 4B. When the label for the type of defect pattern is among the defect data, the electronic apparatus may determine whether the label of the defect pattern corresponds to a new type in operation 525.

When the label of the defect pattern is determined to correspond to a new type in operation 525, the electronic apparatus may determine whether the importance score of the defect data exceeds the first threshold value in operation 535. When it is determined that the importance score of the defect data does not exceed the first threshold value, the electronic apparatus may delete the defect data of the corresponding defect pattern to forget knowledge on the corresponding defect pattern in operation 540, and may train the defect detection model in operation 530. In operation 535, the electronic apparatus may determine whether the importance score of the defect data exceeds the first threshold value. When it is determined that the importance score of the defect data exceeds the first threshold value, the electronic apparatus may train the defect detection model instead of deleting the defect data of the defect pattern in operation 530. The importance score herein may be prior information designated by experts with the knowledge of the defect patterns or defined based on the distribution of each pattern of the data set and the like, and may be information updated according to process changes.

In operations 550 and 555, the electronic apparatus may train the defect detection model until the quality score for the defect pattern becomes less than a second threshold value. The training of the defect detection model may include calculating the quality score of the defect image data that is output from the trained defect detection model and repeatedly performing the training of the defect detection model until the calculated quality score becomes less than the second threshold value. The quality score may be determined based on statistical values including an average value and a standard deviation value of classification prediction values for the defect pattern and on the true/false classification probability value for the defect pattern.

Figure 6:
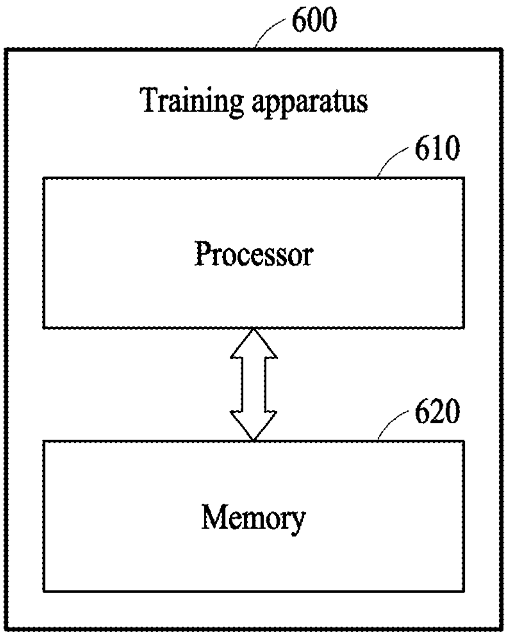
FIG. 6 illustrates an example electronic apparatus with defect detection model training according to one or more embodiments.

FIG. 6 illustrates an example electronic apparatus with defect detection model training according to one or more embodiments.

Referring to FIG. 6, in a non-limiting example, an electronic apparatus 600 may include a processor 610 and a memory 620. Descriptions given with reference to FIGS. 1 to 5 may apply to FIG. 6.

The processor 610 may be configured to perform any one or combination of the operations or methods described herein. The processor 610 may also be configured by the performance of applications or programs that may control the electronic apparatus 600, that, when executed, the processor 610 may train the neural networks to perform defect pattern recognition. The processor 610 and may include any one or a combination of, for example, a central processing unit (CPU), a graphic processing unit (GPU), a neural processing unit (NPU) and tensor processing units (TPUs), and other examples described herein, but is not limited to the above-described examples.

The memory 620 may include computer-readable instructions. The processor 610 may be configured to execute computer-readable instructions, such as those stored in the memory 620, and through execution of the computer-readable instructions, the processor 610 is configured to perform one or more, or any combination, of the operations and/or methods described herein. The memory 610 may be a volatile or nonvolatile memory.

By the control of the processor 610, the electronic apparatus 600 may receive training data corresponding to image data of an object having a defect and, when a label for a type of defect pattern does not exist in the training data, may assign a random label for the defect pattern to the training data. The electronic apparatus 600 may determine whether the label for the type of defect pattern in the training data is a new label and, when the label for the type of defect pattern is a new label, may determine whether an importance score, which represents a frequency of the occurrence of the defect pattern, exceeds a first threshold value. When the importance score of the defect data of the defect pattern does not exceed the first threshold value, the electronic apparatus 600 may delete the defect data of the defect pattern. The electronic apparatus 600 may train the defect detection model using the defect data of the defect pattern of which the importance score exceeds the first threshold value.

By the control of the processor 610, the electronic apparatus 600 may calculate a quality score of defect image data that is output from the trained defect detection model and repeatedly perform the training of the defect detection model until the calculated quality score becomes less than a second threshold value.

The electronic apparatus may use the trained defect detection model (e.g., defect detection model 220) to label a defect pattern from an image (e.g., a defect pattern image) captured by any of the wafer map, SEM, TEM, etc. to determine whether a defect is detected.

The neural networks, machine learning models, processors, memories, electronic apparatuses, electronic apparatus, electronic apparatus 600, processor 610, memory 620, discriminator model 120, generator model 110, CGAN 210, label assigner 300, image generator 310, defect data manager 320, and quality evaluator 330 described herein and disclosed herein described with respect to FIGS. 1-6 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method, the method comprising:
- performing an iterative training operation of a defect detection model, including:
  - randomly assigning a label for a defect pattern of an object having a defect responsive to the defect pattern being determined to be a defect pattern that is not among training data;
  - dependent on the label being determined to be a new label, generating an importance score, which represents a frequency of an occurrence of the defect pattern; and
  - executing the training of the defect detection model using defect data of the defect pattern when the importance score exceeds a first threshold value, and deleting the defect data from the training data when the importance score does not exceed the first threshold value,
  - wherein executing the training of the defect detection model further comprises:
    - generating a quality score of defect image data that is output from the trained defect detection model;
    - determining whether to continue the training of the defect detection model by determining a degree of the training for each label with the quality score,
    - wherein the determining whether to continue the training comprises:
    - continuing to train on a label where the quality score does not reach a second threshold value, and
    - ending training on a label where the quality score reaches the second threshold value.

2. The method of claim 1, wherein the training of the defect detection model comprises
- iteratively performing the training of the defect detection model until the quality score reaches the second threshold value.

3. The method of claim 1, wherein the generating of the quality score is based on statistical values comprising an average value and a standard deviation value of classification prediction values for the defect pattern and on a true/false classification probability value for the defect pattern.

4. The method of claim 1, wherein the generating of the importance score is based on one of a determined predefined frequency of occurrence of the defect data and a determined distribution of each pattern of a data set related to the defect data.

5. The method of claim 1, wherein the assigning of the label includes performing a clustering algorithm and a k-nearest neighbors (k-NN) algorithm and assigning a random label to the defect pattern dependent on a result of the clustering algorithm and the k-nearest neighbors (k-NN) algorithm.

6. The method of claim 1, wherein the defect detection model comprises a conditional generative adversarial network (CGAN).

7. A non-transitory computer-readable storage medium storing instructions that, when executed by a processor, cause the processor to perform the method of claim 1.

8. An electronic apparatus, the apparatus comprising:
- a processor configured to:
- perform an iterative training operation of a defect detection model, including:
  - randomly assign a label for a defect pattern of an object having a defect responsive to the defect pattern being determined to be a defect pattern that is not among training data;
  - dependent on the label being determined to be a new label type, generate an importance score, which represents a frequency of an occurrence of the defect pattern;
  - execute the training of the defect detection model using defect data of the defect pattern when the importance score exceeds a first threshold value; and
  - delete the defect data from the training data when the importance score does not exceed the first threshold value,
- wherein the processor is configured to:
  - generate a quality score of defect image data that is output from the trained defect detection model;
  - determine whether to continue the training of the defect detection model by determining a degree of the training for each label with the quality score,
  - continue to train on a label where the quality score does not reach a second threshold value, and
  - end training on a label where the quality score reaches the second threshold value.

9. The apparatus of claim 8, wherein the processor is configured to:

iteratively perform the training of the defect detection model until the quality score reaches a second threshold value.

10. The apparatus of claim 8, wherein the generating of the quality score is based on statistical values comprising an average value and a standard deviation value of classification prediction values for the defect pattern and on a true/false classification probability value for the defect pattern.

11. The apparatus of claim 8, wherein the generating of the importance score is based on one of a determined predefined frequency of occurrence of the defect data and a determined distribution of each pattern of a data set related to the defect data.

12. The apparatus of claim 8, wherein the assigning of the label includes:

performing a clustering algorithm and a k-nearest neighbors (k-NN) algorithm; and assigning a random label to the detected defect pattern dependent on a result of the clustering algorithm and the k-nearest neighbors (k-NN) algorithm.

13. The apparatus of claim 8, wherein the defect detection model comprises a conditional generative adversarial network (CGAN), and wherein the training data corresponds to image data of an object having the defect.

14. The method of claim 1, further comprising determining whether the defect pattern is among the training data, and wherein the quality score indicates a quality of generation of the defect image data for the defect pattern.

15. A processor-implemented method, the method comprising:

randomly assigning a defect label to a determined unknown defect type not among defect types in a training data set;

generating an importance score for the unknown defect type;

selectively training a machine learning model using the unknown defect type when the importance score meets a first threshold value; and deleting the unknown defect type from the training data set when the importance score fails to meet the first threshold value, wherein executing the training of the machine learning model further comprises:

generating a quality score of defect image data that is output from the trained machine learning model;

determining whether to continue the training of the machine learning model by determining a degree of the training for each label with the quality score, wherein the determining whether to continue the training comprises:

continuing to train on a label where the quality score does not reach a second threshold value, and ending training on a label where the quality score reaches the second threshold value.

16. The method of claim 15, wherein the generating of the importance score includes generating the importance score based on a determined frequency of occurrence of the unknown defect type.

17. The method of claim 15, wherein the method further comprises performing a knowledge distillation of a corresponding pattern of the unknown defect type to add the corresponding pattern to the training data set when the importance score meets the first threshold.

18. The method of claim 15, further comprising:

performing similarity comparisons between a plurality of defect types within the training data set to generate similarity values between respective pairs of the plurality of defect types; and clustering the plurality of defects based on respective similarity values.

19. The method of claim 18, wherein the random assigning of the defect label is based on a respective similarity value between the unknown defect type and a respective defect type of the plurality of defect types having a similar similarity value.

20. The method of claim 15, further comprising using the trained model to detect another defect that is determined to be a known defect type.

* * * * *